R. AMES.
WATER MOTOR.
APPLICATION FILED NOV. 23, 1909.
981,514.
Patented Jan. 10, 1911.
4 SHEETS—SHEET 1.
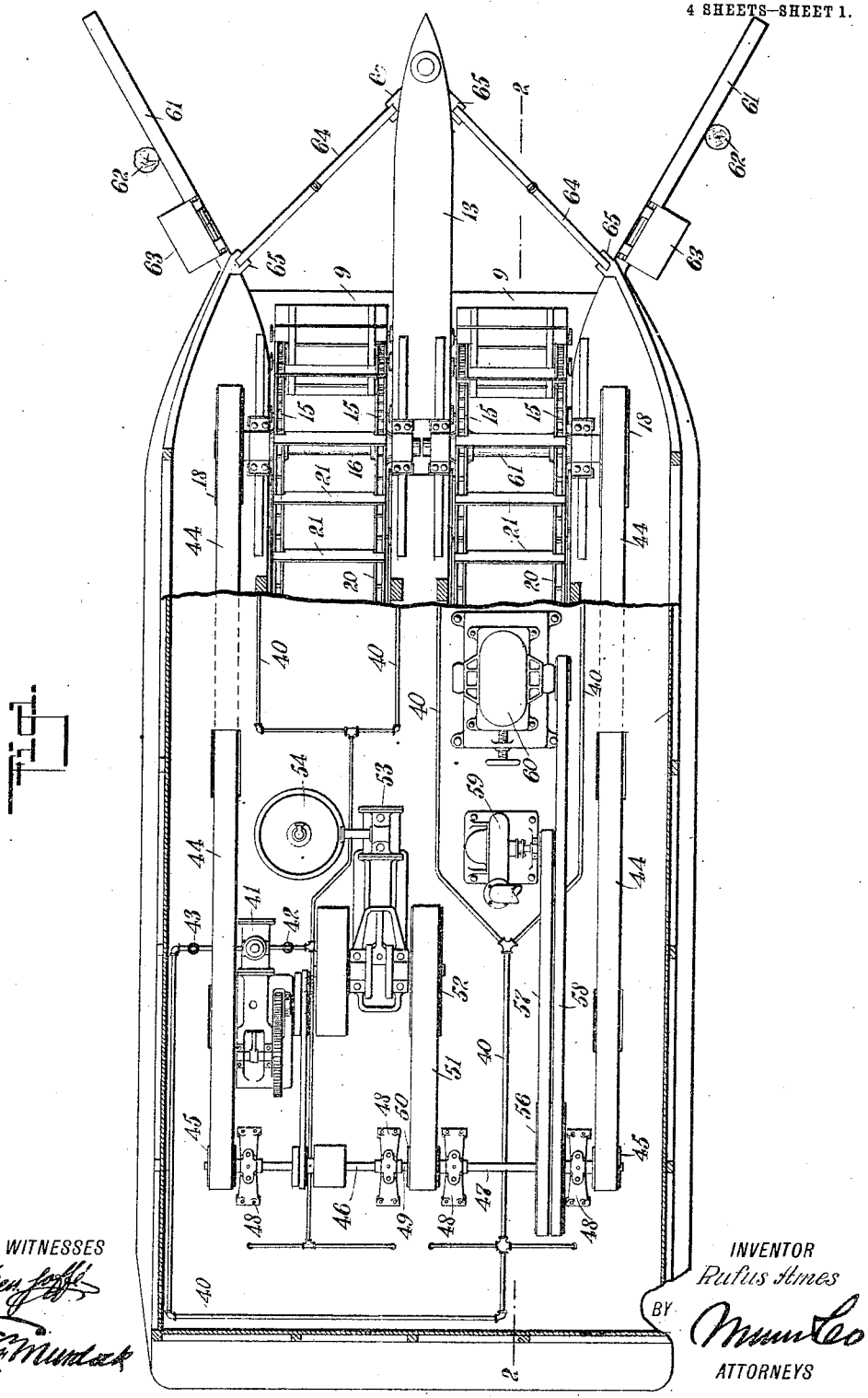
WITNESSES
INVENTOR
Rufus Ames
BY
ATTORNEYS

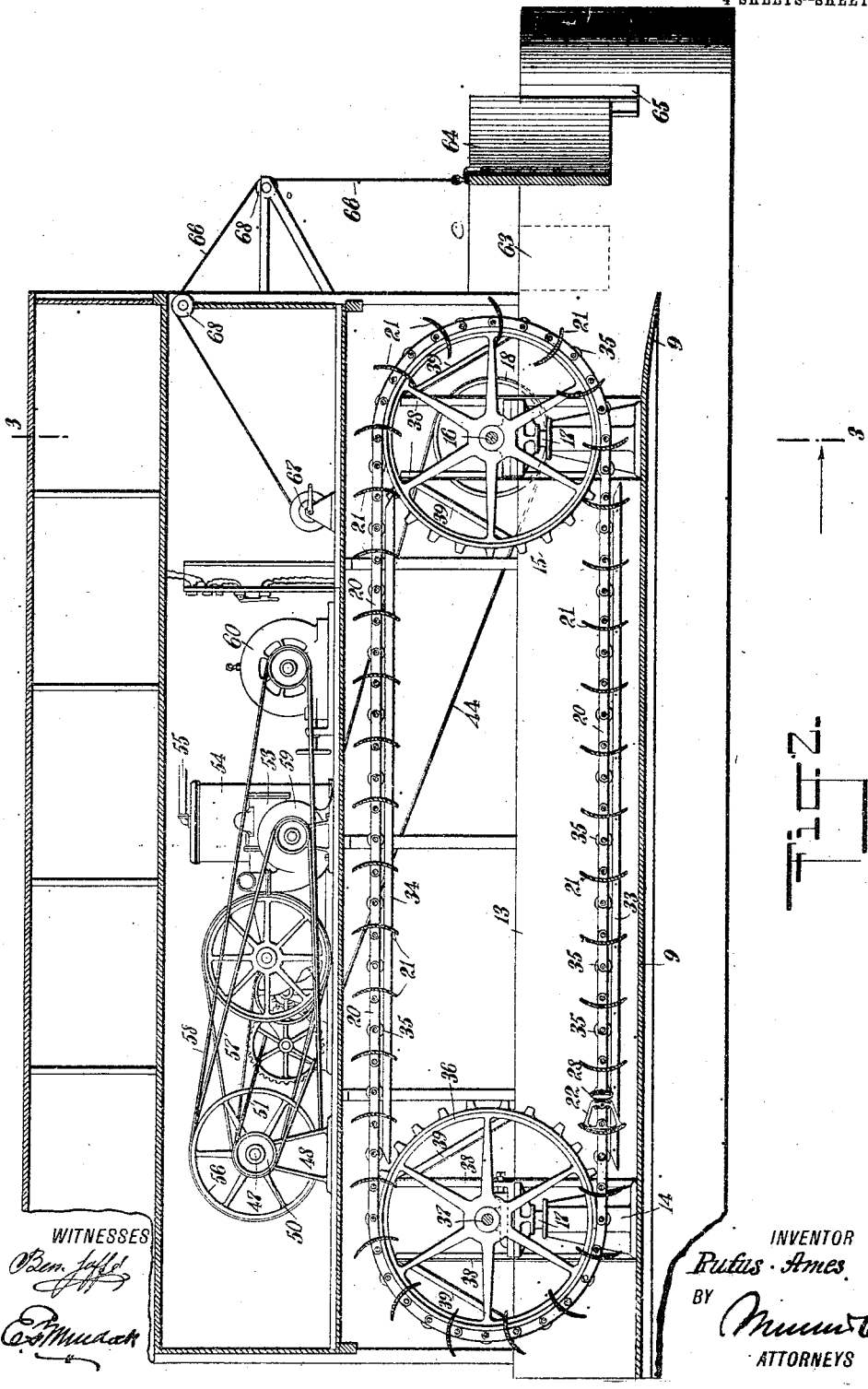

R. AMES.
WATER MOTOR.
APPLICATION FILED NOV. 23, 1909.
981,514.
Patented Jan. 10, 1911.
4 SHEETS—SHEET 3.
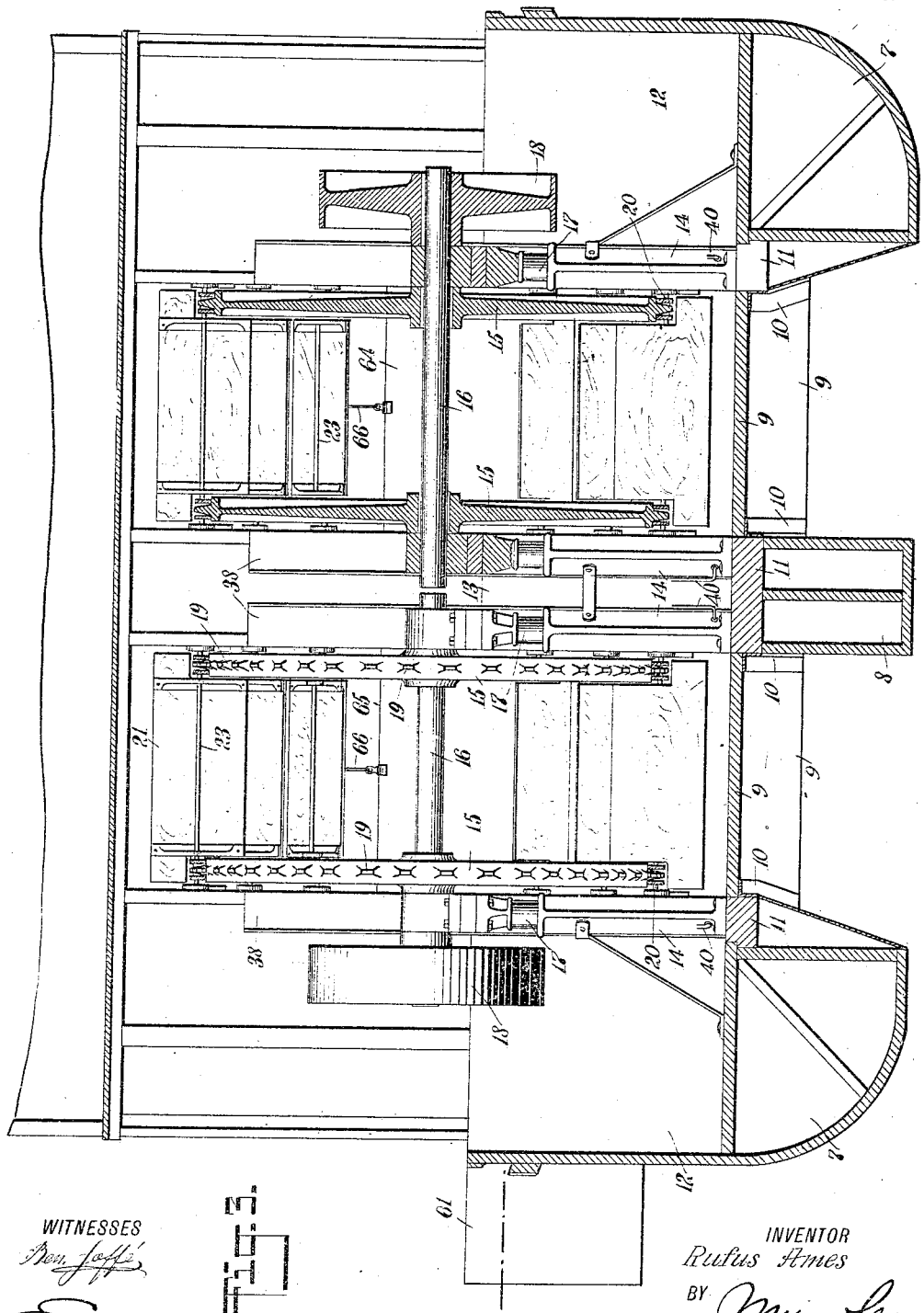
WITNESSES
INVENTOR
Rufus Ames
BY
ATTORNEYS

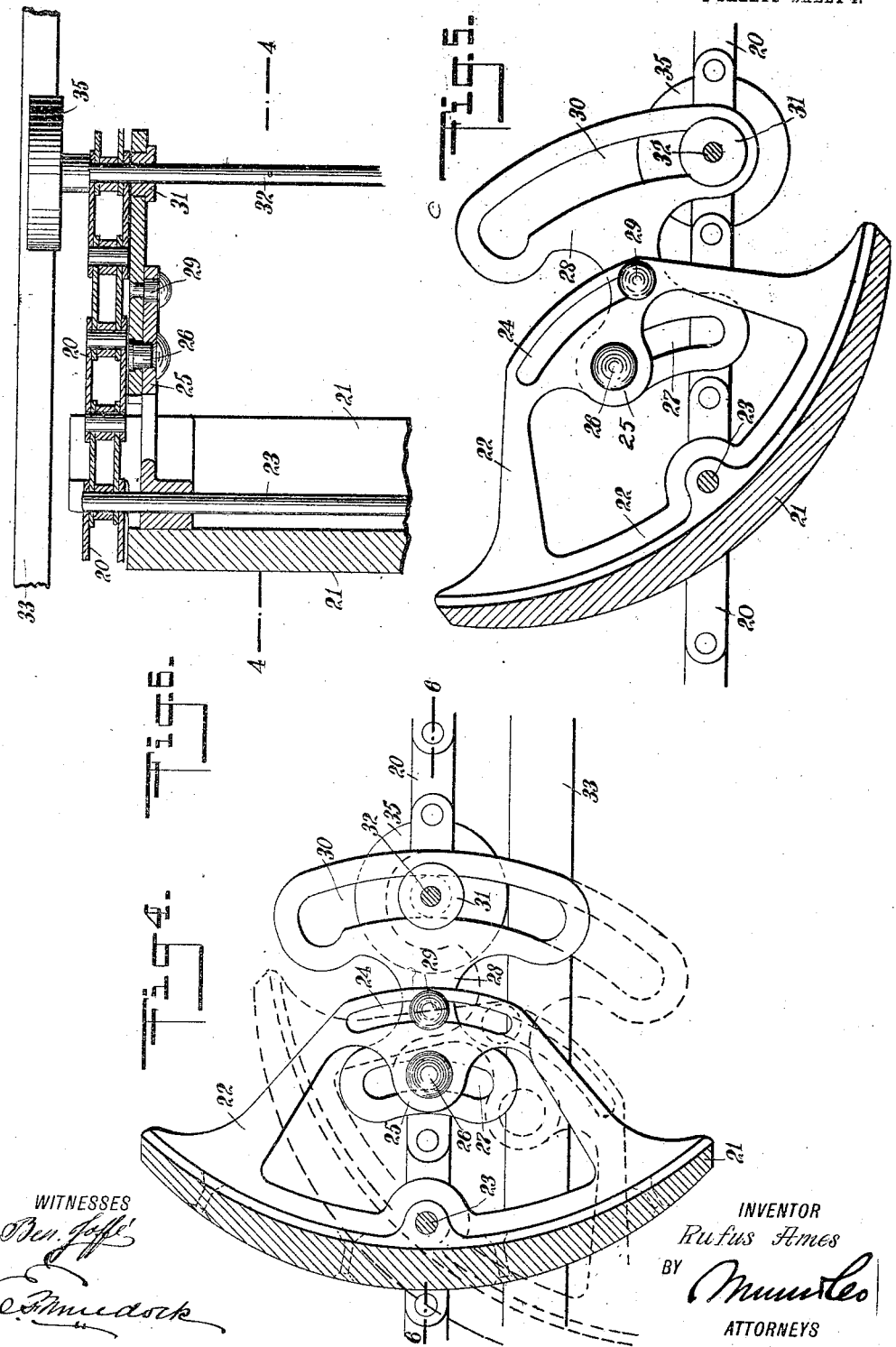

UNITED STATES PATENT OFFICE.

RUFUS AMES, OF SPOKANE, WASHINGTON, ASSIGNOR TO AMERICAN POWER AND LIGHT COMPANY, OF SPOKANE, WASHINGTON.

WATER-MOTOR.

981,514.  Specification of Letters Patent.  Patented Jan. 10, 1911.

Application filed November 23, 1909. Serial No. 529,530.

*To all whom it may concern:*

Be it known that I, RUFUS AMES, a citizen of the United States, and a resident of Spokane, in the county of Spokane and State of Washington, have invented a new and Improved Water-Motor, of which the following is a full, clear, and exact description.

Among the principal objects which the present invention has in view are: to provide a motor of the character described adapted to rest in a moving stream to present a number of moving blades to the impact of the moving water, said blades being connected by flexible means and rotatably mounted upon a rotary shaft; to provide a motor of the character specified adapted to present to a shallow stream a multiplicity of blades to receive the impact thereof; to provide means for increasing the water level of the water while passing through the motor; to provide means for diminishing the water pressure of the stream entering said motor; to provide means for varying the depth of the operation of said blades; to provide a motor of the character specified embodying a plurality of separate motor units adapted to be consolidated; to provide a floating house or support adapted to maintain the operative relation of the motor units to the stream; and to provide power generating mechanisms within the floating structure of the said motor.

One embodiment of the present invention is disclosed in the structure illustrated in the accompanying drawings, in which like characters of reference denote corresponding parts in all the views, and in which—

Figure 1 is a plan view of a motor and floating structure therefor constructed and arranged in accordance with the present invention; Fig. 2 is a longitudinal vertical section of the same taken on the line 2—2 in Fig. 1; Fig. 3 is an enlarged vertical section of the same taken on the line 3—3 in Fig. 2; Fig. 4 is an enlarged detail sectional view on the line 4—4 in Fig. 6, of the pivotal mounting of a motor blade; showing the motor blade connected with said mounting; Fig. 5 is an enlarged detail view of the said mounting showing the blade at an angle varied from that shown in the previous figure; and Fig. 6 is a detail view in horizontal section taken on the line 6—6 in Fig. 4.

The present motor is designed for operation in any stream above or below tide water therein. In its preferred application, as illustrated in the drawings, it is located above tide water influence. The motor is also peculiarly adapted for operation in shallow streams.

A housing is constructed upon laterally extended floats 7, 7 and 8. These floats are preferably formed as air tight compartments. Between the floats are formed decks 9, 9 connected to angle iron supports 10, 10. The decks 9, 9 are joined to the floats 7, 7 and 8 by means of sills 11, 11. The sills 11, 11 are supported on the floats 7, 7 and 8 at any height above the water. Above the sills 11, 11 are extended side frames forming runways 12, 12 and a partition 13. The partition 13 is suitably divided and the side walls of the runways 12, 12 are recessed to receive the mountings of hydraulic jacks 14, 14. The partition 13 and side walls of the runways 12, 12 constitute, with the decks 9, 9, two box flumes within the floating structure. It is within these flumes that the endless chains of paddles operate to rotate the driving wheels and driving shaft connected therewith. The driving wheels are large sprocket wheels 15, 15. These wheels are mounted in pairs, as shown particularly in Fig. 3 of the drawings, and are fixedly secured upon shafts 16, 16. The shafts 16, 16 are mounted in suitable bearings, the lower members of which are rigidly or integrally connected with arms 17, 17 of the hydraulic jacks 14, 14. Fixedly mounted upon the shafts 16, 16 are driving pulleys 18, 18. The sprocket wheels 15, 15 are formed to any desired diameter, and are provided on the periphery with sprockets 19, 19. The sprockets 19, 19 extend between the blocks of chains 20, 20, the chains being driven thereby.

Extended between the chains 20, 20 are curved blades 21, 21. The blades 21, 21 are placed upon the said chains at suitable intervals as close as the conditions under which the motor is operated will allow. The blades 21 are curved substantially as illustrated in Figs. 4 and 5 of the drawings, and are securely fastened to brackets 22, 22. The brackets 22 are pivotally mounted on the chains by means of rods 23, 23 extended between the two chains in the manner illustrated in Figs. 3 and 5 of the drawings. The bearings formed in the brackets 22 for the rods 23 are so disposed that when the blades 21 are immersed in the flowing water, the pressure of the blades will be such as to hold the same in a substantially vertical position. At the moment of entering and leaving the water the blades are thrown to either of the positions shown by the dotted lines in Fig. 4 or the full lines in Fig. 5. The positions shown in said figures mark the limits of the throw of the said blades. The links controlling this action are shown in detail in Figs. 4 to 6 inclusive. The brackets 22 have provided in the extended ends thereof curved slots 24. The slots 24 are curved concentrically with the rods 23, which form the pivots for the rocking of the blades 21. On extensions 25 of the said brackets are riveted pivot pins 26. The pins 26 extend through slots 27 formed in links 28. The links 28 have riveted in the body portion thereof pivot pins 29, which are extended through and held in engagement by the slots 24. By means of the pivot pins 26 and 29 the links 28 and brackets 22 are held inseparably connected but movably related. In the forward end of the links 28 are formed enlarged slots 30, the office of which is to engage anti-friction wheels 31. The wheels 31, 31 are mounted upon shafts 32, 32 extended between the chains 20, 20. The links 28 are held by the wheels 31 in sliding and guiding relation thereto.

By means of the mechanism above described the rock of the blades 21, 21 is free and easy, but limited to the positions assumed when the links 28 and brackets 22 assume the positions illustrated in Fig. 4 in dotted lines and Fig. 5 in full lines, wherein the pivot pins 26 and 29 and the wheels 31 are each resting in the ends of their respective engaged slots.

The chains 20, 20 are supported in the horizontal reaches of the chains upon track sections 33 and 34. The section 33 is disposed with relation to the deck 9, the track 33 being mounted in the side wall of the partition 13 and the runways 12. Upon the ends of the shafts 32 are mounted carrying wheels 35, 35. The shafts 32 are passed through the links of the chains 20 at the joined connection thereof.

The track sections 33 and 34 extend between and in line with the wheels 15, 15 and idler wheels 36, 36. The idler wheels 36, 36 are fixedly mounted upon a shaft 37, which is mounted in bearings, the bottom member of which is rigidly secured to or integrally formed with the arms 17 of the jacks 14. The heads of the arms 17 are guided by vertical rails 38, 38, which, at the upper end, are suitably braced by angle bars 39, 39. The jacks 14 are connected by pipes 40, 40 with a hydraulic pump 41. The system of pipes 40, 40 is arranged in duplicate, and each duplicate set is connected with each of the jacks 14, resting beneath the bearings of the wheels 15, 15 and 36, 36 in each of the motor units. A motor unit herein is constituted by the wheels 15, 15 and 36, 36 and the chains and blades connected therewith.

The delivery of the water from the pump 41 into one or the other of the two systems, is regulated by valves 42 and 43. When the valve 42 is open and the valve 43 closed, the unit shown on the upper side of the median line of the drawing in Fig. 1 is operated by the water moved from the said pump 41. The water entering the jacks 14, 14 quickly lifts each of the arms 17, 17 and the wheels 15, 15 and 36, 36 connected therewith. If the water pressure and supply be maintained, these wheels are finally raised to a height at which the blades 21, 21 are lifted clear of the water flowing over the deck 9 in the flume formed by the said deck and the walls of the partition 13 and runways 12. At any point in the lift of the jacks 14 the arms 17 may be arrested by closing the valve controlling the inlet of water to the said jacks. By manipulating the valve controlling the various pipes of the hydraulic distribution, the motor units on either side may be independently or conjointly raised and lowered, and the power generated thereby increased or diminished.

When the blades 21, 21 are lowered in the water running through the flumes above the deck 9, the wheels 15, 15 and 36, 36, and the shafts carrying the same, are rotated in proportion to the rapidity of the flow of the stream. The shafts 16, as stated, have fixedly mounted thereon the pulleys 18, 18. The pulleys 18, 18 have thereon mounted belts 44, 44. The belts 44, 44 are each connected with pulleys 45, 45, being the driven pulleys fixedly mounted upon short shafts 46 and 47. The shafts 46 and 47 are mounted in bearings formed in standards 48, 48, and are connected to a short shaft 49 by any suitable clutch mechanism. Fixedly mounted upon the shaft 49 is a driven pulley 50. The driven pulley 50 drives a belt 51, which is passed about a large pulley 52 of an air compressor 53. The compressor 53 is utilized to store air under pressure in a tank 54. By means of suitable piping 55, embodying flexible connections, the air contained in the tank 54 is led away to the point where it may be used for any of the known purposes in which compressed air is used.

Upon the shaft 47 is fixedly mounted a driving pulley 56, which is belt connected by means of belts 57 and 58 with a rotary fan 59 and an electric dynamo 60 respectively. When it is desired to discontinue the use of either the fan or dynamo, the belt controlling the same is slipped from the driven pulley connected therewith.

There are above described the various uses for which this motor may be employed, illustrating thereby the need for a disassociation at certain periods of the two motor units, and also the need of the uniting of the two, as in the case of both of the shafts 46 and 47 being employed in driving the air compressor 53 and distribution system connected therewith.

The water of the stream in which the motor is placed is passed through the motor and enters the flume boxes of which the decks 9, 9 form the bottom. The height and weight of the water contained in the said flumes is increased by the use of impounding wings 61, 61. The forward surface of the wings 61, 61 is maintained flush with the curved forward surface of the floats 7, 7. The wings 61 are diverged from the median line of the motor at angles, the degree of which is controlled by the speed and volume of the water of the stream in which the motor is floated. The outspread arm directs the water inward to the contracted areas of the flumes. In this action each wing is assisted by the projected end of the partition 13. The water, being thus diverged toward the flumes of relatively contracted areas, being forced therein and therefrom by the force of the water upstream, piles up, forming within the flumes a water level higher than the surrounding water in which the floats rest. This action of the wings and partition 13 is supplemented by the downwardly curved end of the decks 9, forming thereby an upwardly inclined way, effecting a mechanical lift of the water entering the flume. Within the flume, the result at the immediate forward end is to pour the water to its maximum height. In passing through the flume the water settles to, and is finally delivered at, the tail end of the flume at the level of the outer water. In doing this, the water level is dropped the several inches or feet to which it has been piled at the receiving end of the flumes. This drop in the body of the water produces a multiplied rush of the water emptying from the tail of the flume, thereby adding materially to the driving force of the stream of water.

The impounding wings 61 are fixed in relation to the floats 7, 7, and are reinforced to receive the impact of the flow of the stream by one or more piles 62, 62, which are driven into the bed of the stream at the back of the said wings.

To relieve the impounded water when the same is not required in the flumes, and as a safe-guard against the strain in times of freshet, I have provided sluice gates 63, 63, which, when opened, deliver the water laterally away from the flumes. I have also provided lock gates 64, 64, which are vertically operated and guidably mounted in slots formed in brackets 65, 65. These gates are elevated by means of cables 66, 66, which are wound upon a winch 67, after being reeved over sheaves 68, 68. By turning the winch 67, the gates 64, 64 may be raised or lowered, as desired, partially or totally closing the entrance up-stream to either of the flumes in the motor. When these lock gates are dropped, the sluice gates 63, 63 are opened to provide for the out passage of the water from the impounding wings 61, 61.

Having thus described my invention, what I claim as new and desire to secure by Letters Patent is:—

1. A water motor comprising a floated housing arranged to form internal water ways; a plurality of sprocket wheels separated and mounted on suitable driving shafts; endless link chains rotatively connecting said wheels; a plurality of concave blades pivotally mounted on said chains to extend into said water ways; mountings for said blades embodying a plurality of link members pivoted each to the other and limited in their swing by an interposed member, said links being connected one to the said blades and one to the said chains; suitable generating mechanisms mounted in said housing; and transmission devices connecting said motor and said generating mechanisms.

2. A water motor comprising a floated housing arranged to form internal water ways; a plurality of sprocket wheels separated and mounted on suitable driving shafts; endless link chains rotatively connecting said wheels; a plurality of concave blades pivotally mounted on said chains to extend into said water ways; mountings for said blades embodying a plurality of link members pivoted each to the other and limited in their swing by an interposed member; said links being connected one to the said blades and one to the said chains; track rails mounted on said housing in said water ways; carrying wheels mounted on said chains to track on said rails to support and guide the said chains; suitable generating mechanisms mounted in said housing; and transmission devices connecting said motor and generating mechanisms.

3. A water motor embodying a plurality of carrying wheels; an endless belt rotatively engaging said carrying wheels in supported relation thereon; a plurality of transversely disposed blades pivotally mounted on said belt; a mounting for said blades comprising a plurality of link plates having a series of concentrically curved slots; and a plurality of pivot pins, one whereof is mounted in each of said plates and engaged in holding relation with one of said slots in the opposite plate and in sliding engagement therewith.

4. A water motor embodying a plurality of endless belts; a plurality of carrying wheels for said belts; a series of power blades pivotally mounted on said belts; and mountings for the said blades comprising a plurality of shafts extended between said belts to form a pivot for each of said blades, a plurality of guide plates mounted upon said blades and extended in parallel relation to said belts, said blades being provided at the outer extremity with a slot disposed concentric to said shaft; a plurality of governing plates for said blades pivotally connected with each of said belts by a slotted extension, the slot whereof is formed concentric with the shaft of the blade governed by said plate; a plurality of pivots mounted on said belts and extended within the slot in said governing plates; a plurality of guide pins fixedly mounted in said governing plates in engaged relation with the slot in the said guide plates; and means for pivotally connecting said guide pins and governing plates between the said shaft and guide pin.

In testimony whereof I have signed my name to this specification in the presence of two subscribing witnesses.

RUFUS AMES.

Witnesses:
A. F. KEHMEIER,
F. BROWNING.